United States Patent [19]

Ryder et al.

[11] Patent Number: 4,736,872
[45] Date of Patent: Apr. 12, 1988

[54] DISPOSABLE TINT PACK ASSEMBLY FOR CONTACT LENS TINTING

[75] Inventors: Francis E. Ryder, Arab; Rowland W. Kanner, Guntersville; Richard Rabenau, Arab, all of Ala.

[73] Assignee: National Patent Development Corp., New York, N.Y.

[21] Appl. No.: 94,098

[22] Filed: Sep. 4, 1987

Related U.S. Application Data

[63] Continuation of Ser. No. 840,892, Mar. 18, 1986, abandoned.

[51] Int. Cl.⁴ ............................................. B65D 35/22
[52] U.S. Cl. ............................. 222/94; 222/96; 222/105; 222/209; 222/212; 222/181; 222/183; 141/312; 141/320; 118/410; 118/415
[58] Field of Search .................. 206/221, 219; 222/94, 222/95, 96, 105, 131, 132, 183, 181, 185, 207, 209, 145, 190, 325, 182, 212; 141/312, 320, 261, 262; 118/410, 409, 415

[56] References Cited

U.S. PATENT DOCUMENTS

| | | | |
|---|---|---|---|
| 3,149,943 | 9/1964 | Amador | 206/221 |
| 3,405,843 | 10/1968 | Watson | 222/105 |
| 3,407,968 | 10/1968 | Figuet et al. | 222/105 |
| 3,435,990 | 4/1969 | Pike | 222/183 |
| 3,736,933 | 6/1973 | Szabo | 222/94 |
| 3,952,918 | 4/1976 | Poitras et al. | 222/181 |
| 4,560,093 | 12/1985 | Cassia | 222/325 |
| 4,570,827 | 2/1986 | Roggenburg et al. | 222/181 |

FOREIGN PATENT DOCUMENTS 2727679 11/1978 Fed. Rep. of Germany ...... 222/181

Primary Examiner—H. Grant Skaggs
Attorney, Agent, or Firm—Trexler, Bushnell, Giangiorgi & Blackstone, Ltd.

[57] ABSTRACT

A disposable tint pack assembly is provided for use in a contact lens tinting apparatus. This disposable assembly includes a plurality of disposable packages, each for containing a supply of a given fluid material for use in a contact lens tinting process carried out by the apparatus. A fluid dispensing apparatus is coupled with each of these packages and is selectively operable for dispensing the fluid contained therein, preferably in premeasured, incremental quantities. A tray-like carrier member is provided for supporting and locating all of the packages in predetermined relative positions for use in a given order in the lens tinting process carried out by the tinting apparatus. A retaining structure is provided for releasably holding each of the packages in the desired position in the carrier tray. The invention also extends to individual portions or sub-assemblies of the foregoing tint pack assembly.

21 Claims, 4 Drawing Sheets

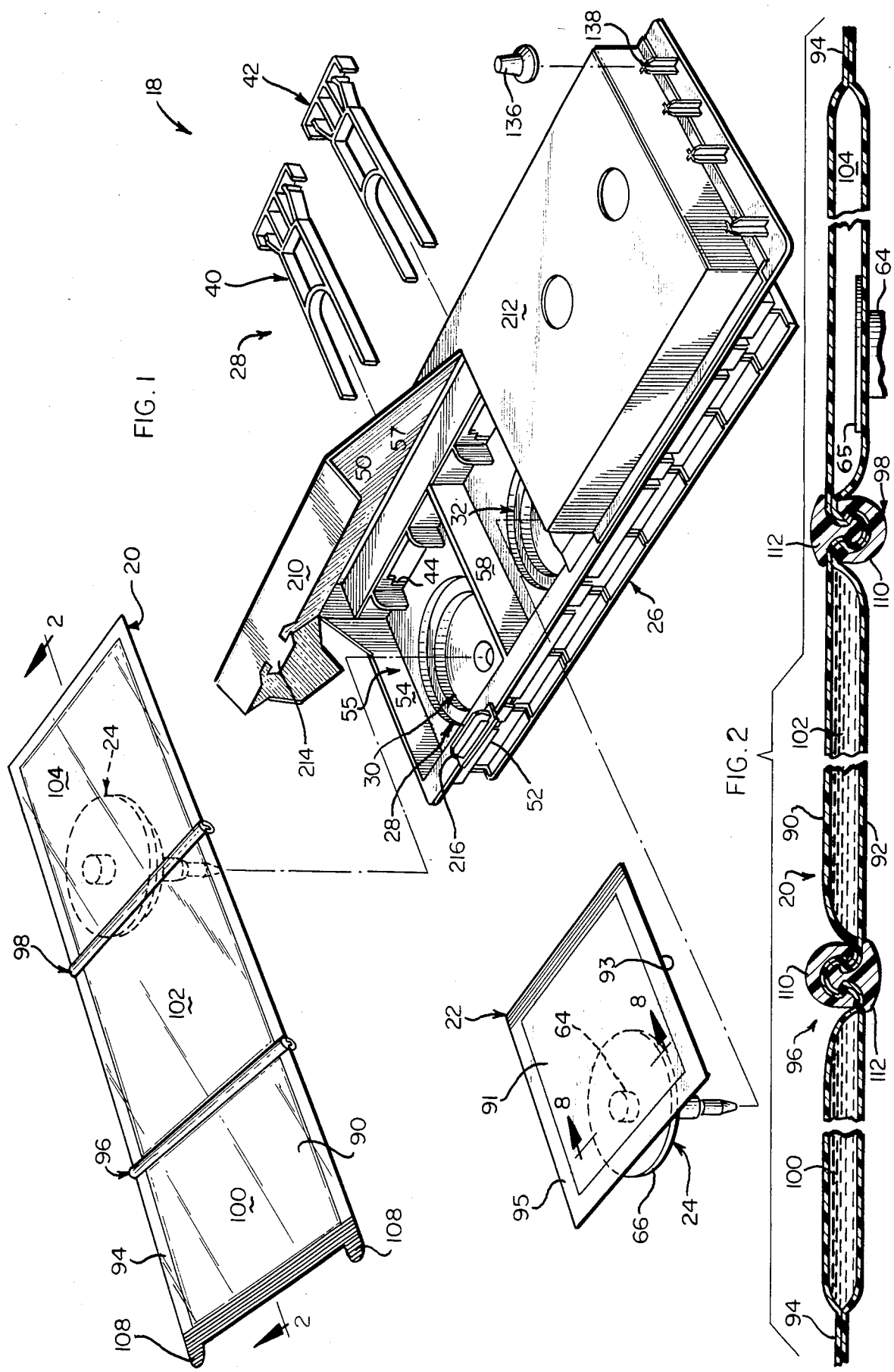

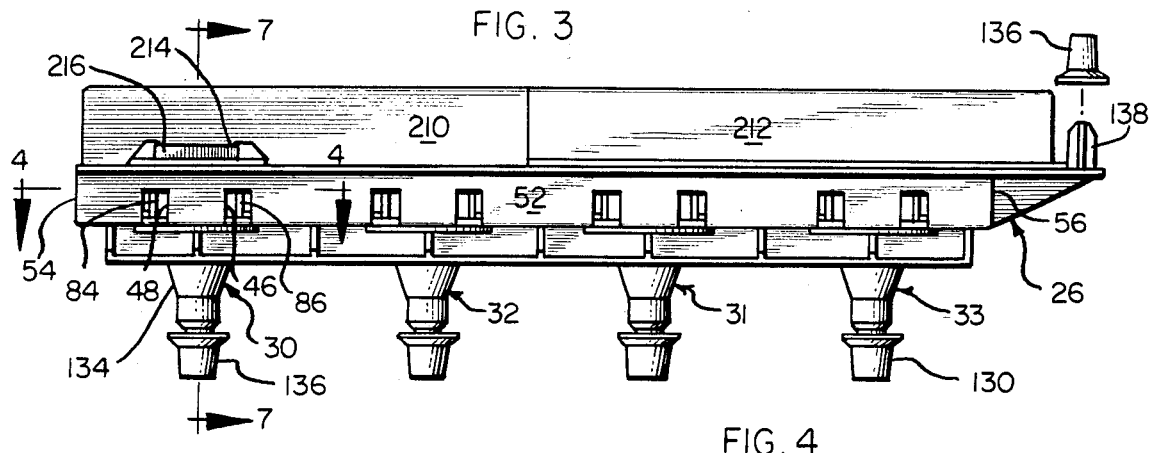
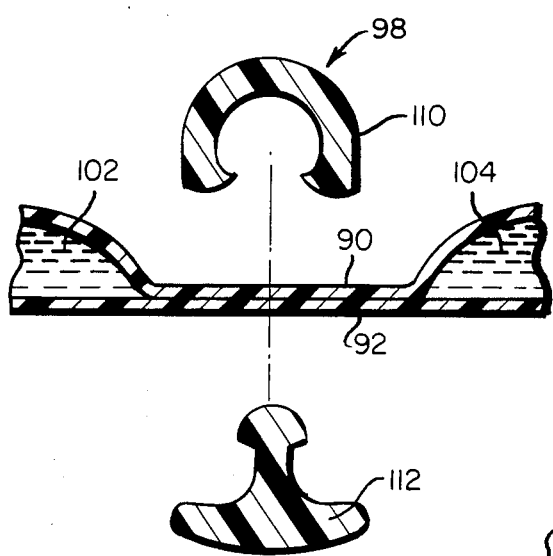
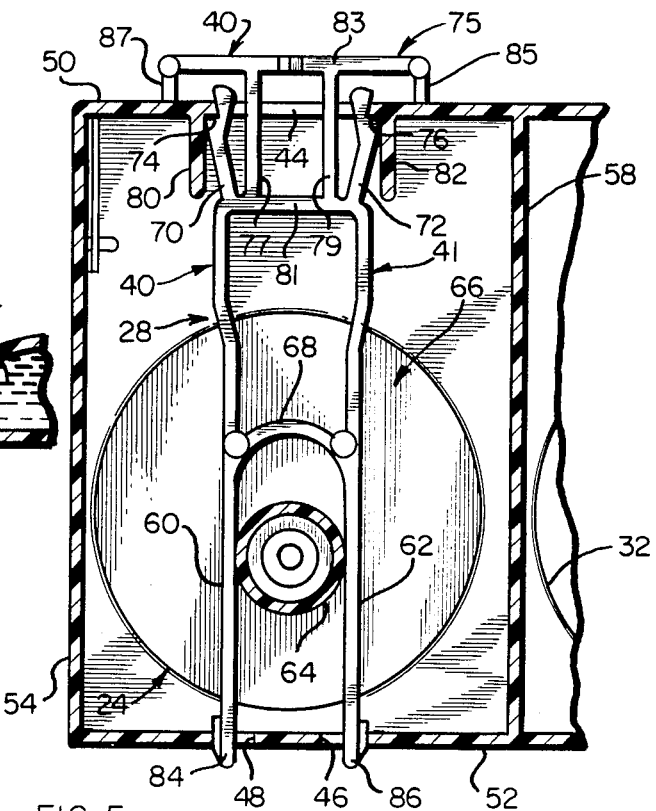
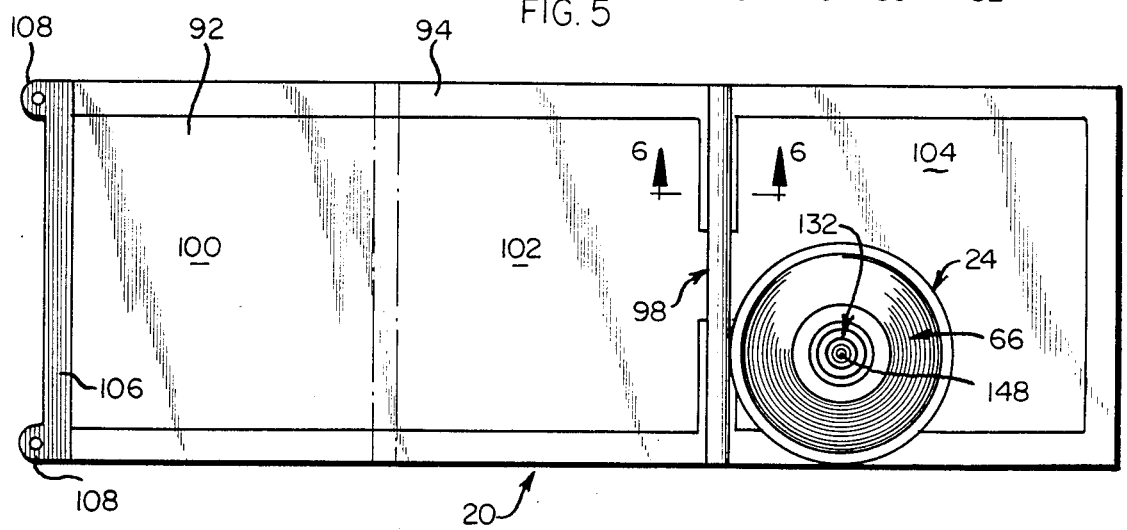

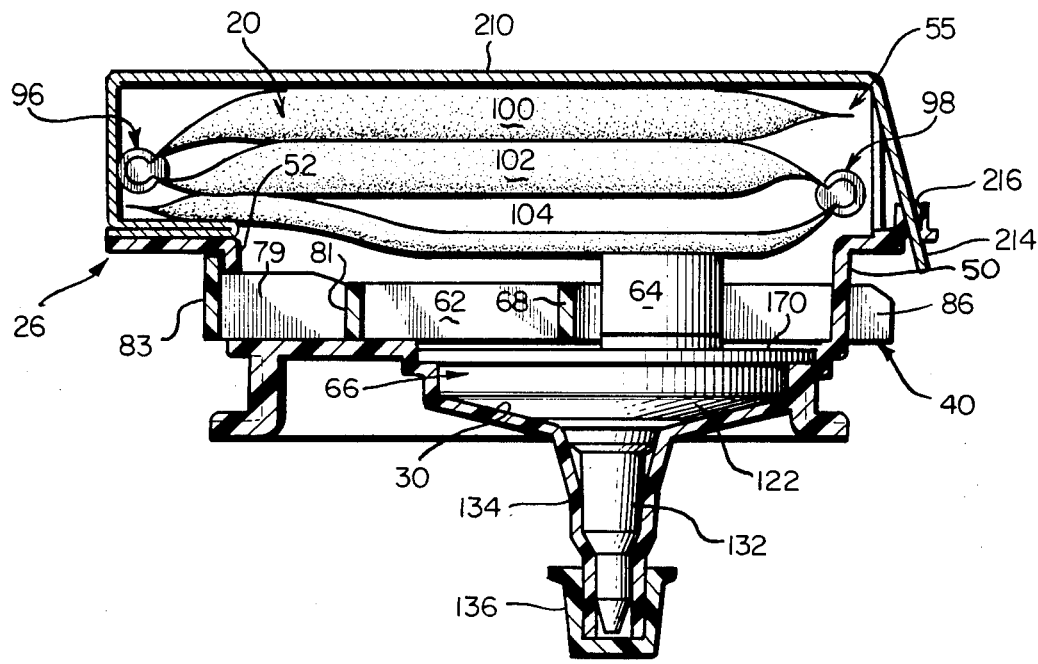

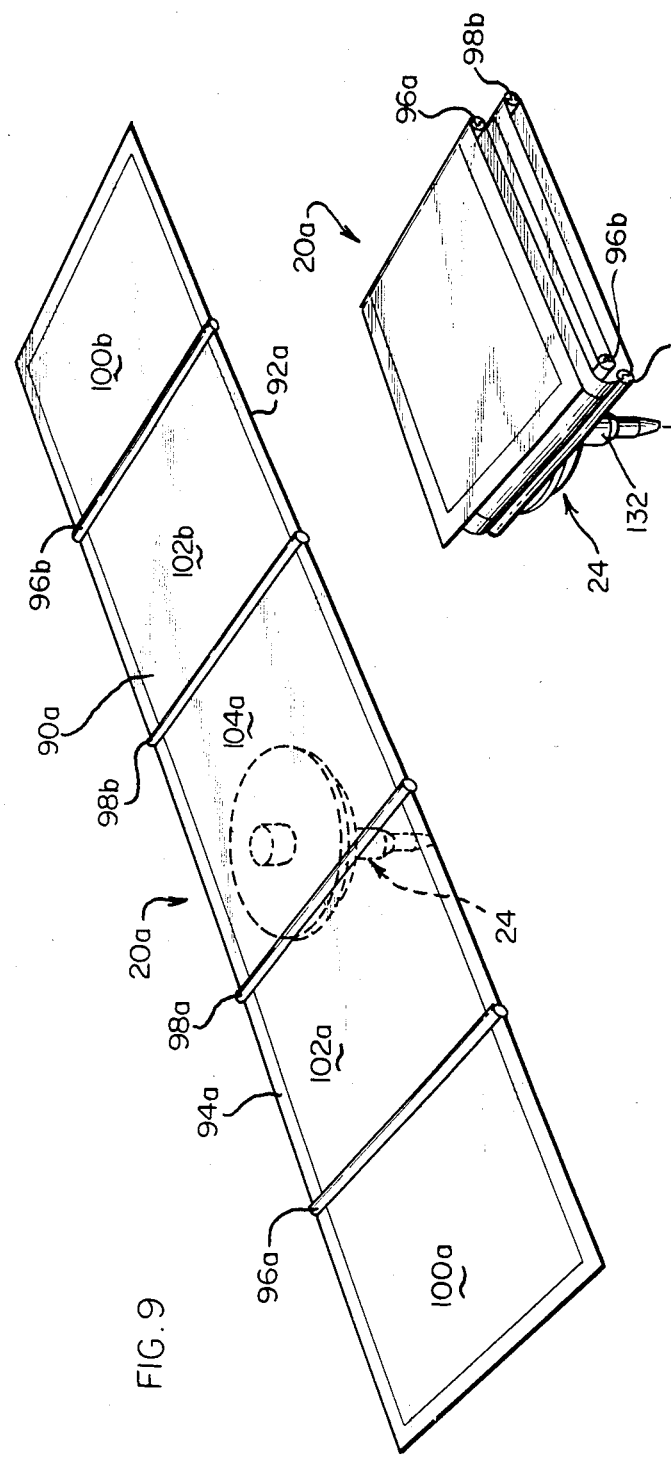
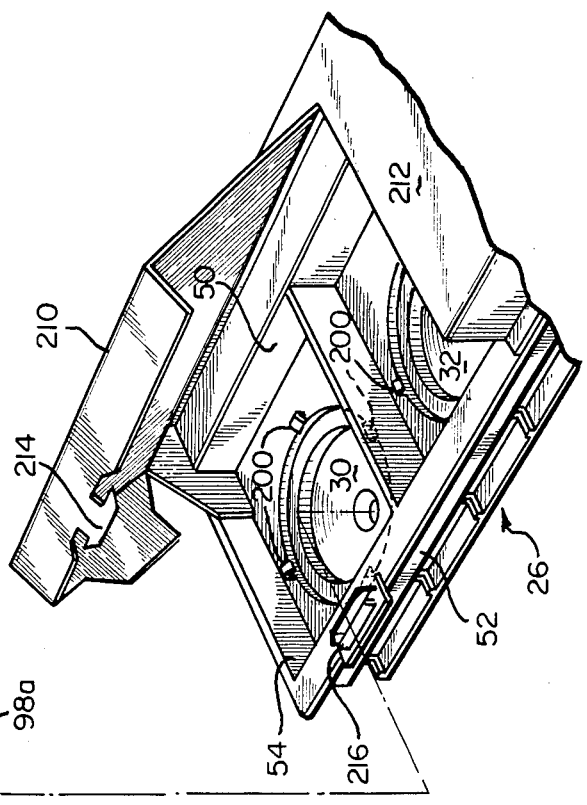
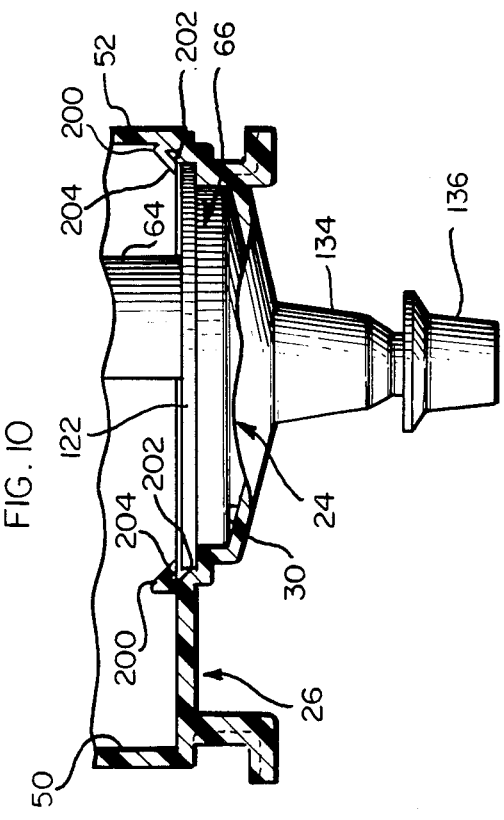

DISPOSABLE TINT PACK ASSEMBLY FOR CONTACT LENS TINTING

This is a continuation of application Ser. No. 840,892 filed Mar. 18, 1986 and now abandoned.

BACKGROUND OF THE INVENTION

This invention is directed generally to a novel disposable tint pack assembly for use in contact lens tinting, and more particularly, to an assembly including a plurality of disposable, flexible storage pouches for storing quantities of fluids utilized in the automated tinting of contact lenses, and dispensing structures coupled therewith for dispensing incremental quantities of fluid therefrom during the tinting process.

A novel automated contact lens tinting apparatus is disclosed and claimed in the co-pending application of Francis E. Ryder et al., Ser. No. 715,095 filed Mar. 22, 1985, now U.S. Pat. No. 4,632,055. The present application, as well as this co-pending application are directed to the tinting or coloration of contact lenses and more particularly to a novel apparatus and method for carrying out such tinting in an automated fashion.

In recent years, the so-called "soft" contact lenses have met with widespread acceptance. The soft lenses are generally manufactured from a hydrophylic plastic material. That is, this type of lense can absorb and retain water and thereby become soft and pliable, and are therefore relatively comfortable for extended periods of wear.

It has also become accepted to tint these soft contact lenses, and as such the tinted or colored lenses provide additional advantages or attractions to many wearers. For example, the tinted lenses may be desired by patients for cosmetic reasons, such as correction of discoloration or disfigurement of the eyes caused by illness or accident. Such tinted lenses may be used by patients with diplopia to give the eyes a more normal appearance. Similarly, tinted or colored lenses may provide albino and aniridic patients with improved general ocular and facial appearance. Of course, such tinted lenses may also be utlilized to reduce light transmission and enchance visual comfort in the presence of high light levels, and also to enhance the general overall appearance of the wearer by providing an option as to eye color.

The above-referenced co-pending application of Ryder et al. sets forth a particularly advantageous apparatus and method for permitting a relatively simple and highly automated process of coloring or tinting contact lenses. The apparatus is sufficiently simple and reliable in operation to permit its use on the premises of an individual eye care provider, thereby avoiding the need for lenses to be custom ordered from a manufacturing facility, wherein relatively complex, and sophisticated equipment is used for the tinting process. Moreover, operation of the conventional manufacturing facility-type of equipment requires relatively skilled, highly trained technicians or operators, whereas the apparatus of the above-mentioned co-pending application requires but a minimum of training and supervision to operate reliably.

Generally speaking, the tinting of lenses involves the placement of the lens on a fixture discussed more fully in the above-referenced co-pending application and other applications referenced therein. Thereafter, a predetermined amount of heat energy is applied to the lens to enhance its receptiveness to the subsequent setting or fixing of dye thereupon. The dyeing process is then performed on the heated lens in a number of operations which are carried out in a given sequence. These operations include initially applying the dye in the desired, generally annular pattern to the lens carried within the fixture. The dye is applied to an interior surface of the lens and allowed to permeate into the pores of the material during an ensuing period. Thereafter, several additional fluids are applied in sequence to complete the dying and tinting process, to accomplish the setting of the dye by rinsing the lens with these additional fluids.

More particularly, following initial application of the dye and an initial drying or setting period, a sodium nitrite solution of on the order of 5% concentration is applied. Immediately thereafter, a dilute sulphuric acid solution also of on the order of 5% concentration is applied. This latter solution acts as an oxidizing agent, so that the water soluble dye precipitates and becomes a water insoluble salt entrapped within the polymer matrix of the lens. Finally, a sodium bicarbonate solution of on the order of 5% concentration is applied to neutralize the sulphuric acid. While the above-referenced co-pending application of Ryder et al. discloses and claims a novel apparatus for carrying out the above dyeing process in an automated fashion, the present application provides a novel, disposable tint apparatus for containing premeasured quantities of the fluids utilized in the process. These fluids include a dyeing solution of desired color, as well as each of the above-described solutions in separate packages or pouches, to be applied in automated fashion by the apparatus of the co-pending application.

One problem that has arisen in connection with the automated dying of contact lenses is the relative instability and shaft shelf or operating life of the dying solution, once the fluid dye concentrate has been mixed with a suitable amount of water to form a solution of the desired concentration for application to the lens. In this regard, the introduction of oxygen both from the water mixed with the dye concentrate and from exposure to air during and after this mixing tends to break down the dye, such that it has a relatively short service life, once mixed or placed in solution with water.

Moreover, we have found it desirable to provide the premeasured quantities of solution, as well as dispensing mechanisms therefor in a disposable, sterile package. This assures that only enough dye and other solutions for tinting a predetermined, relatively small number of lenses (preferably on the order of 20) be provided in a disposable package. This disposability further enhances the maintenance of desired sterile and sanitary conditions of the apparatus and process. Also, the provision of but limited quaitities of dyeing solutions in disposable packages facilitates relatively simple and rapid changing of one disposable package for another when it is desired to tint but one or a few lenses in each of a variety of colors. That is, the disposable packages may be readily interchanged in the apparatus to permit an almost immediate resumption of tinting of further lenses in a new color. Additionally, it will be appreciated that the provision of but a limited quantity of the foregoing solutions facilitates the provision of but a limited quantity of the relatively unstable dye solution, thus limiting the period of time during which this solution will be in use and hence have an opportunity to deteriorate.

We have found that the provision of such disposable packages also requires that dispensing members or portions, which preferably comprise diaphragm pump-like members as shown generally in the above-mentioned co-pending application and as described more fully in this application, be attached to the packages and hence be disposable also. This in turn requires that these dispensing members be fabricated in a relatively inexpensive molding process from a moldable plastics material. However, it has been found that such plastics materials are generally oxygen permeable, and it will be recalled that the presence of oxygen tends to break down the dye, once in solution.

Accordingly, the present invention also extends to a novel compartmented pouch arrangement for containing the dye concentrate and a suitable quantity of water separately. Advantageously, the pouch arrangement of the invention permits ready and simple intermixing of the dye concentrate and water immediately prior to use thereof in the tinting operation. In this way, the shelf life of the dying solution is greatly extended, since the dye concentrate is mixed with the water portion only immediately prior to commencement of tinting, and the separate components are held in separate, air-tight sealed pouches prior to this time.

The present invention also includes a tray-like receptacle or carrier member which is advantageouely configured to cooperate with the tinting machine or apparatus described in the above-referenced co-pending application. In this regard, the tray or receptacle member both receives and arranges the pouches containing the dye and each of the other solutions described above in the proper order for automatic application of each by the apparatus in the order described above. As will be further described herein, novel releaseable retaining means are also provided for permitting relatively simple and expeditious preassembly of the individual dye and solution-containing pouch members, as well as the dispensing members coupled therewith, with the tray-like receptacle or carrier structure. Thereafter, none of the component pouches need be removed from the tray-like carrier either prior to or during the tinting operation, and the entire carrier and contents may be disposed of after tinting a predetermined number of lenses. However, the novel tray-like receptacle of the invention also permits ready access to the dye and water containing pouch-like portion to permit the above-described intermixing of the dye concentrate and water immediately prior to use thereof in the tinting process.

BRIEF DESCRIPTION OF THE DRAWINGS

The features of the present invention which are believed to be novel are set forth with particularlity in the appended claims. The organization and manner of operation, together with further objects and advantages thereof, may best be understood by reference to the following description taken in connection with the accompanying drawings in the several figures of which like reference numerals identify like elements, and in which:

FIG. 1 is an exploded perspective view illustrating component parts of the disposable tint pack assembly of the invention and indicating the manner of assembly thereof;

FIG. 2 is an enlarged partial sectional view taken generally in the plane of the line 2—2 of FIG. 1;

FIG. 3 is a front elevation of the assembled tint pack assembly of FIG. 1;

FIG. 4 is an enlarged partial sectional view taken generally along the line 4—4 of FIG. 3;

FIG. 5 is a top plan view of a disposable, multiply compartmented dye pouch member of FIG. 1, illustrating the manner in which dye concentrate and water may be intermixed therein immediately prior to use;

FIG. 6 is an enlarged partial or sectional view taken generally along the line 6—6 of FIG. 5 and also illustrating the removal of clip-like divider means from the dye pack or pouch of FIG. 5 to permit the intermixing;

FIG. 7 is an enlarged sectional view taken generally in the plane of the line 7—7 of FIG. 3;

FIG. 8 is an additionally enlarged partial sectional view taken generally along the line 8—8 of FIG. 1 and illustrating further details of a portion thereof;

FIG. 9 is a perspective view of an alternate form of multiply-compartmented disposable dye pouch, being an alternate embodiment of the form illustrated in FIG. 5;

FIG. 10 is an enlarged sectional view, illustrating an alternate arrangement for retaining respective pouches or reservoirs within the tray-like member; and FIG. 11 is an exploded partial perspective view similar to FIG. 1 and illustrating the assembly of the pouch structure of FIG. 9 with a carrier tray, utilizing the retaining structure of FIG. 10.

DETAILED DESCRIPTION OF THE ILLUSTRATED EMBODIMENT

Referring now to the drawings and initially to FIG. 1, there is shown in exploded perspective a disposable tint pack assembly for contact lens tinting comprising a plurality of components or sub-assemblies. As illustrated in FIG. 1, the tint pack assembly 18 includes a plurality of disposable package means or package sub-assemblies 20 and 22, each of which contains a supply of a given fluid material for use in a contact lens tinting process. The respective package units or sub-assemblies 20 and 22 are of a different form, the package 20 being configured for containing the dye substance used in the contact lens tinting, and the package 22 being configured for containing another fluid used in the process, as will be more fully described hereinbelow. While only one sub-assembly of the type identified by reference character 20 will be used, the overall tinting package 18 will employ a plurality of the sub-assemblies 22, with only one such assembly 22 being shown in FIG. 1.

In this regard, the tint pack assembly 18 shown in FIG. 1 is intended for use in connection with an automated lens tinting apparatus of the type shown in the co-pending application of Ryder et al., Ser. No. 715,095, filed Mar. 22, 1985.

Suffice it to say at present, that the tint pack assembly of FIG. 1 utilizes but a single dye-containing package or sub-assembly 20 and three separate disposable packages of the same as package 22, each for containing one of an additional three fluids used in the process, as will be more fully described hereinbelow.

The tint pack assembly 18 of FIG. 1 also includes fluid dispensing means or a dispenser member or apparatus 24 coupled to each of the package means 20, 22 and selectively operable for dispensing the fluid from its associated package. A tray-like carrier sub-assembly or tray means 26 is provided for receiving and supporting and locating each of the packages or package means 20, 22, as well as two additional packages of the same form as package 22, as previously noted, in predetermined relative positions therein for use in the lens tinting apparatus mentioned above in a given order in the lens tinting process. Additionally, retaining means 28 are provided for releasably retaining each of the package means 20, 22 in its predetermined relative position in the tray means 26. In the illustrated embodiment, the retaining means comprise respective well-like recesses or receptacle portions 30, 32 formed in the tray assembly 26 of complementary configuration for receiving respective dispenser apparatus 24 therein, and an elongate resilient clip-like member 40, 42 associated with each of the packages 20, 22 and receptacles 30, 32.

Referring also to FIGS. 3, 4 and 7, these clip members are configured for extending through respective sets of aligned through apertures 44 and 46, 48 which are formed in opposing side wall portions 50, 52 of the tray 26. These walls 50 and 52 in the illustrated embodiment comprise front and rear walls of the elongate tray structure 26 which in addition includes opposing upstanding opposite side or end walls 54, 56 and respective divider walls 58 intermediate the respective wells or recess 30, 32. These upstanding walls 50, 52, 54, 56 generally provide a hollow interior volume for receiving the respective packages 21, 22, etc. within the tray 26.

The resilient clip members 40 and 42 extend through their respective aligned through apertures in the tray 26 so as to overlie the dispenser members 24 lying in the respective wells or recesses 30, 32 and, upon engagement with the respective aligned apertures 44, 46 to hold these dispensing members 24 securely, but removably, in place. This in turn holds the associated packages 20, 22, etc. to which dispensers 24 are attached in place, each in the desired position or location along the length of the tray 26. Referring to FIGS. 3 and 4, it will be seen that the tray 26 provides two additional ones of the recesses 31, 33 therein, substantially identical to recesses 30, 32 and provided with similar aligned through apertures for receiving clips therethrough as described above. The first of these recesses 30 receives the tint package 20, while each of the remaining three recesses 31, 32, 33 receives a package of the form of package 22 containing another fluid for use in the process.

Preferably, the order of the packages and their contents are arranged from left to right as viewed in FIGS. 1 and 3 as follows: the first package 20 contains the dye material; the second package 22 contains a quantity of sodium nitrite solution of on the order of 5% concentration; the next package, substantially identical in form to package 22 contains dilute sulphuric acid solution of on the order of 5% concentration, and the last package, also substantially identical to package 22 contains a sodium bicarbonate solution of on the order of 5% concentration.

Referring more particularly to the structure of the clip members 40, 42, as also shown in FIG. 4, each clip member includes a pair of generally parallel spaced-apart resilient elongate legs 60, 62 which are arranged for surroundingly embracing an upwardly extending neck portion 64 on the dispenser apparatus 24. In this regard, the dispenser apparatus 24 includes an enlarged body portion 66 of a given, preferably circlar cross-sectional dimension, which is coupled by the relatively decreased or reduced cross-sectional dimension or diameter neck 64 to depend from its associated package 20 or 22. The flexible legs 60, 62 are coupled at a mid portion thereof by a transversely extending generally arcuate support strut 68, to define generally resilient or flexible outer end parts thereof and a generally rigid or unbending frame-like support portion 41. Formed on this latter portion 41 are further resilient engaging portions and an enlarged abutment or head portion 70, 72 and 75, respectively.

It will be seen that the engaging means or portions 70, 72 comprise rearwardly extending flexible or resiliently bendable fingers having opposite outwardly facing shoulder or notch portions 74, 76 thereon for engaging opposing inner surfaces of the wall 50 adjacent either side of through aperture 44 therein. In this regard, additional inwardly extending support members or wall segments 80, 82 may be provided for defining complementary shoulder portions for engagement with shoulders or notches 74, 76. The enlarged, generally T-shaped head or abutment portion 75 is then arranged for engaging an outer surface of wall 50 generally to either side of the through aperture 44. In this regard, the length of the clip member 40 is sufficient to extend completely transversely across the tray member 26, such that a forward portion of the legs 60 and 62 extend through the respective through apertures 46, 48. In this regard, respective ramp-like or cam lead-in surfaces 84, 86 are preferably provided at leading edge portions of these legs 60, 62 to facilitate engagement with and partial passage through these through apertures 46, 48.

The T-shaped head portion 75 is formed by a pair of upwardly extending support members or portions 77, 79 spaced inwardly from the resilient engagement fingers or members 70, 72 and extending from a transversely extending joining or base member 81 from which the legs 60, 62 and fingers 70, 72 project oppositely outwardly. An enlarged head or end portion 83 extends transversely of support members 77 and 79 and extends laterally outwardly to either side of aperture 44. Downwardly depending abutment members 85, 87 are formed to either end of this latter transverse enlarged head 83 for abutting the wall 50 to either side of through aperture 44.

While it is intended that the packages 20, 22, etc. not be removed, once fixed in place in tray 26 with clips 40, 42, etc. the clips are removable. That is, grasping of the outwardly protruding end portions of respective locking or engaging fingers 70, 72 will permit the engaged shoulder portions or notches 74, 76 to disengage for withdrawal thereof and of the entire clip device, to enable removal of the associated package 20 or 22.

Referring now also to FIG. 2, of each the packages 20 and 22 will be seen to comprise a flexible enclosure or pouch means for containing a supply of fluid. One of the dispensing means 24, as previously mentioned, is operatively coupled with each of the flexible pouch means at a neck portion 64 thereof which has a further flange 65 for this purpose. Moreover, as will be more fully explained hereinbelow, the dispensing means or members 24 are adapted for receiving and selectively dispensing the fluid from the associated pouch means in predetermined or measured increments.

Each of the pouch means or members 20 and 22 is preferably formed from a pair of generally rectangular flexible sheets of material 90, 91 and 92, 93 which are joined together as by heat sealing or by other suitable means around peripheral edges 94 and 95 thereof to define a flexible enclosure member comprising pouch 20 or 22. The pouch or enclosure 22 defines but a single compartment in direct communication by way of the neck 64 with the associated dispensing member 24.

However, in accordance with a feature of the invention, the enclosure or pouch member 20 for the dye solution is elongated and further includes a plurality of releasable closure, divider or clip-like means 96, 98 extending transversely thereacross so as to define a plurality of separate compartments 100, 102 and 104 therein. Preferably the compartments are at least three in number as indicated in FIGS. 1 and 5, to which reference is now directed. The compartments 100 and 102 contain premeasured supplies of a dye concentrate and water, respectively, while the third compartment or reservoir 104, which is the compartment operatively coupled with the dispensing apparatus 24, is initially provided empty or devoid of fluid. Advantageously, this arrangement prevents mixing of the dye concentrate and water in solution, and introduction of air thereto by way of the dispensing assembly 24 or by way of residual air, within either the water or within compartment 104, until immediately prior to commencement of the tinting process.

Reference is also invited to FIG. 6, wherein the operation releasable closure means or clip-like device 96 is shown in additional detail. In this regard, it will be noted that the pouch-like member or portion of dye containing package assembly 20 is an elongate member relative to the almost square configuration of single compartment pouch 22. Preferably, the overall length of multiple compartmented pouch 20 is on the order of three times that of single pouch 22. Accordingly, the first releasable closure or clip means 96 separates the two fluid-containing compartments 100 and 102, while second clip means 98 separates these first and second compartments from the third or dispensing compartment 104.

Hence, immediately prior to commencement of the tinting operation, as indicated in FIGS. 5 and 6, the first clip means 96 may be removed to permit intermixing of the dye concentrate and water in compartments 100 and 102, to produce a dye solution of the desired concentration for use in the tinting process. Immediately thereafter, the second clip means 98 may be removed (a shown in phantom line in FIG. 6) and the now intermixed dye solution is introduced to dispensing compartment 104. Thereupon, with all of the solution introduced into dispensing compartment 104, clip 98 is replaced in its initial position to maintain all of the dye solution in the dispensing compartment 104 for use in the tinting process. Preferably, some external agitation, as by manually rhythmically pressing and releasing compartments 100 and 102 upon removal of clip 96, is utilized to assure thorough mixing of the dye concentrate and water. Thereafter, the mixed dye solution is caused to flow, preferably by gravity, by lifting end 106 of the pouch 20 after removal of clip 98, this end 106 being provided with additional grasping tabs 108 to permit such manipulation thereof. The compartments 100, 102 may also be manually squeezed or compressed to assure that all or substantially all of the mixed dye solution therefrom is delivered into compartment 104 prior to replacement of clip 98. Due to the configuration of the package 22 and extension of the compatments 100 and 102 from one side of the reservoir compartment 104, this operation may be performed with the package 22 assembled with the tray 26. It is envisioned, however, that this procedure could be effected with the package 22 removed, and then subsequently reassembled to the tray 26.

Referring to FIG. 6, it will be seen that the clip members or assemblies 96 and 98 each comprise an elongate, generally cross-sectionally U-shaped cross-section female clip member 110 of sufficient length to extend transversely across the elongate enclosure or pouch 20 and a complementary elongate male clip member 112 for snappingly engaging and interfitting within the U-shaped female clip member 110. The male clip member 112 is also preferably of sufficient length to extend transversely across the pouch or enclosure 20. It will be seen that upon snapping engagement and interfitting of male clip member 112 within female clip member 110, the material of the flexible pouch 20 is tightly engaged and compressed therebetween so as to effectively separate and define the independent compartments 100, 102, and 102, 104 respectively.

Referring next to FIGS. 7 and 8, the dispensing means or apparatus 24 will be seen to comprise diaphragm pump means for incrementally pumping a measured predetermined amount of liquid or fluid from the associated pouch means. The previously mentioned body portion 66 comprises a flat, rigid, generally circular upper wall portion 120 and a flexible, compressible diaphragm portion 122 coupled therewith and together therewith forming a compressible reservoir portion 124 having a predetermined fluid capacity. The reservoir 124 thus defined has an inlet portion or opening 126 which communicates with a hollow interior of the neck 64, which in turn communicates with the interior of the associated pouch means or package 20 or 22 as previously mentioned. The reservoir 124 also has a fluid outlet orifice 128 which comprises a generally centrally located through aperture in flexible diaphragm 122.

Referring briefly to FIG. 7, it will be seen that the clip member 40 surroundingly embraces neck 64 as previously mentioned and overlies or abuts the rigid top wall portion 120 of the body 66 of dispensing means 24. Moreover, the fluid outlet orifice 128 communicates with a central enlarged through bore 130 of an elongate nipple or outlet means or member 132. Cooperatively, the recess portion or means 30 formed in the tray 26 includes a hollow, downwardly depending, open-ended portion or projection 134 for receiving and rigidly supporting the outlet nipple 132. An additional cap or closure member 136 is also provided to prevent any leakage of material from the tray member when not in use. As best viewed in FIGS. 1 and 3, a plurality of upstanding post members 138 may be provided for receiving the respective caps or closure members 136 when the tint pack is in use during the tinting process, such that the caps may be replaced on their respective outlets upon completion of the tinting process, or when a different tint pack is to be substituted in the tinting apparatus, for example, for tinting lenses a different color.

The diaphragm portion 122 has a generally cylindrical side wall portion 140 and a downwardly depending generally frustroconical flexible or resilient end wall portion 142 which has through aperture or outlet 128 formed substantially centrally therein. In the illustrated embodiment, frustroconical flexible wall portion 142 further has at its central portion a further downwardly depending generally cylindrical wall portion 144 for receiving outlet nipple 32, which terminates in a generally circular end wall 146 having through aperture or outlet 128 formed substantially centrally therein.

In the illustrated embodiment, the diaphragm 122 is upwardly axially compressible relative to an axis 135 defined by elongate nipple 132 for releasing a premeasured incremental quantity of fluid from the reservoir 124, which quantity corresponds substantially to the fluid capacity thereof. In this regard, the lens tinting apparatus of the above-referenced co-pending application actuates the dispensing means 24 by axially upwardly displacing the nipple 132 which results in corresponding resilient movement or displacement of diaphragm 122 and compression of reservoir 124. Accordingly, and with reference to FIG. 7, it will be seen that the provision of relatively rigid support by support portion 134 of tray 26 facilitates such axial displacement while substantially avoiding any transverse motion or "wobbling" of the elongate nipple 132. In this regard, the open outer end of tray support portion 134 is of sufficient diameter to permit access to a tapered end portion 147 and corresponding end opening 148 of the nipple 132.

In accordance with the invention, the dispensing means or assembly 24 also includes valve means for controlling the flow of fluid to and from the reservoir portion 124 thereof. This valve means includes a first check valve 150 in the inlet means or portion 126 for blocking the flow of fluid to the reservoir 124 when it is in its compressed condition and for permitting the reservoir to fill with fluid to the capacity thereof as the reservoir returns from the compressed condition to an uncompressed or relaxed state, which latter state is illustrated in FIG. 8. Cooperatively, a second check valve means or assembly 152 is provided at the outlet 128 and is normally biased into a closed condition for closing outlet 128. However, second valve assembly 152 is responsive to displacement of the outlet means which is caused by displacement of the nipple 132 and diaphragm 122 in the axial direction, for compressing the reservoir for substantially simultaneously unblocking or opening outlet orifice 128 to release fluid from the reservoir portion through outlet orifice 128 and nipple 132.

The valve means further includes a third check valve means or assembly 154 which is located in the outlet means or nipple 132 for substantially preventing backflow of fluid therethrough. In this later regard, check valve 154 comprises a valve body 156 having valve seat 157 with a through orifice 158, and a ball type check member 160. The valve body 156 rests in a lower end portion of a relatively enlarged through bore 130 at the area where this bore 130 reduces in diameter to form a further, relatively reduced diameter bore portion 162. Accordingly, it will be seen that any backflow of fluid through reduced diameter bore portion 162, which is adjacent outlet 148, will cause ball check element 160 to close against the valve seat 157 thus closing off orifice 158.

Referring now in additional detail to first check valve 150, this check valve comprises a relatively shallow, generally cylindrical valve chamber 170 and a disc valve member or body 172 disposed therewithin. Valve chamber 170 has respective inlet and outlet orifices 174 and 176 which communicates respectively with neck 64 and reservoir 124. The disc 172 is of somewhat lesser diameter than chamber 170 but of greater diameter than inlet orifice 174. Accordingly, upon compression of reservoir 124, disc body 172 is driven against orifice 174, thus preventing flow of fluid therethrough and into reservoir 124. However, disc 172 is supported upon relatively short support members or portions 178 which generally prevents closure of outlet orifice 176. Accordingly, as the reservoir 124 resiliently returns from a compressed state to an uncompressed or relaxed state, disc 172 will be released from inlet 174, and seat against supports 178, thereby allowing flow of fluid through both orifice 174 and orifice 176 and hence through the inlet portion 126 for filling reservoir 124.

During the foregoing filling of reservoir 125, second check valve or valve assembly 152 will maintain outlet orifice 128 closed. In this regard, this valve assembly 152 comprises a valve body having an elongate shaft 180 and enlarged head portion 182. The elongate shaft 180 is of lesser diameter than through opening 128 and extends generally upwardly co-axially therethrough in the direction of top wall 120 of the pump or dispensing apparatus body 66. Cooperatively, the inner surface of wall 120 acts as an abutment surface defining full axial advancement of the shaft 180. In the illustrated embodiment, the inner wall surface of wall 120 is also provided with a generally annular projecting guide portion 184 for receiving and guiding an end part of shaft 180. It will be noted that with the diaphragm 122 in the relaxed condition illustrated in FIG. 8, a slight gap 185 is left between the axial outer end of shaft 180 and inner wall or abutment surface of wall 120. Accordingly, some upward axial movement of the valve body comprising shaft 180 and head 182 is permitted, but thereafter, the valve body will remain stationary upon further upward axial movement of the nipple 132, diaphragm 122 and corresponding compression of reservoir 124.

The enlarged head portion 182 is sized for axial movement in bore 130 to permit fluid flow therearound through bore 130 and carries a generally annular seal means or seal member 186 around shaft 180. The head 182 is normally biased by resilient biasing means comprising a compression spring 188 in an axially upward direction for causing sealing engagement of seal 186 with outlet aperture 128.

The resilient biasing means or compression spring 188 is engaged intermediate the valve body member 156 on the one side and the enlarged head member 182 on the other side, and each of these member is provided with a generally annular peripheral shoulder portion for receiving and locating the compression spring 188 in this fashion. From the foregoing, it will be seen that upon an initial small amount of upward movement of nipple 132 and the resulting compression of diaphragm 122, compression spring 188 will drive valve body 181 upwardly until shaft 180 traverses the slight gap or space 185 and engages the abutment surface underside of wall 120. Upon further movement of nipple 132 and reduction in volume of the reservoir 124 in response to axial upward movement of diaphragm 122, the outlet aperture 128 will be moved free of the now stationary head 182 and seal 186 to an open condition, permitting flow of fluid therethrough and through outlet nipple 132, so as to deliver the premeasured quantity of fluid to nipple 132. The quantity of fluid dispensed is in direct relation to the upward stroke of the nipplee 132 to be produced by the tinting machine (not shown). The spring 188 tends to return the components to their original positions. Accordingly, it will be seen that axial movement in either direction of either of the nipple 132 or reservoir 122 results in a corresponding axial movement of the other for alternately dispensing fluid from the reservoir and drawing fluid from chamber 104 into the reservoir to fill with fluid upon respective operation of the first and second check valves 150 and 152 in response to compression and relaxation of the reservoir diaphragm 122.

Referring now briefly to FIGS. 9 through 11, an alternative form of the dye solution containing package or pouch means 20 and an alternate arrangement for retaining each package and its corresponding dispensing apparatus in the tray 26 are illustrated. Referring initially to FIG. 9, an alternate dye solution package or pouch means is designated by reference numeral 20a.

The structure of this package or pouch means 20a is substantially similar to the package or pouch means 20 described hereinabove, being formed of elongate flexible sheets 90a, 92a joined about their peripheal edges as indicated at 94a. However, pouch means 20a defines a total of five separate and independent compartments along its length. Respective compartments 100a and 100b at opposite outer ends of elongate pouch 20a contain the dye concentrate, similar to compartment 100 described above. Similarly, intermediate compartments 102a and 102b contain water to be intermixed with the dye concentrates of their respective neighboring compartments 100a and 100b immediately prior to commencement of the tinting operation. Remaining center or dispensing compartment 104a remains empty or devoid of fluid, like above-described compartment 104 prior to the tinting operation. This latter compartment 104a also has the dispensing means or diaphragm pump assembly 24 operatively coupled therewith and in communication with the interior thereof.

Similar releasable clip means 98a and 98b separate compartment 104a from compartments 102a and 102b to either side thereof. Similarly, removable or releaseable clip means or assemblies 96a and 96b are also provided intermediate the respective compartments 100a and 102a and compartments 100b and 102b Each of these clips 96a, 96b, 98a and 98b is substantially identical in form to the clip assemblies 96 and 98 previously described.

The preparation and use of the dye solution in the package means or pouch 20a is also substantially identical to that described with respect to package 20. However, it will be noted that package 20a may be provided with twice the dye capacity of package 20, if desired, with two batches of dye being independently mixed and used in sequence. That is, the dye contained in compartment 100a may initially be mixed with the water contained in compartment 102a and this dye solution delivered to dispensing compartment 104a for use in the tinting operation. Upon exhaustion of this quantity of dye solution, the mixing procedure may be repeated with respect to the contents of compartments 100b and 102b for continued tinting operation.

Preferably, however, in view of the relatively unstable nature of the dye solution once mixed and introduced to dispensing compartment 104a, each of compartments 100a and 100b preferably contains a lesser quantity, such as on the order of one-half of the amount of dye concentrate carried in compartment 100 of the previously described embodiment. In this way, relatively smaller quantities of dye solution may be prepared and mixed and delivered to the dispensing compartment 104a, so as to further avoid possible decomposition thereof prior to completion of a desired plural number of tinting operations.

Referring now to FIGS. 10 and 11, an alternate form of retaining means for retaining each of packages 20, 22 or alternate by configured package 20a within the tray assembly 26 is illustrated. This alternate retaining means takes the form of a plurality of upwardly extending, resilient fingers or gripping members 200 located about the periphery of the receptacle or recess portions 30, 32, etc. Preferably, these resilient gripping members or fingers have radially inwardly extending hook-like portions 202 for extending over and engaging the upper wall surface 122 of the dispensing means body portion 66. Preferably, these hook-like portions 202 also form at their opposite surfaces cam or ramp-like lead-in surfaces 204 which diverge generally radially inwardly for guiding the body 66 into snapping engagement with the hook-like portions 202. That is, the resilient gripping members 200 resiliently deflect generally radially outwardly somewhat to permit passage of body 66 and of top wall portion 122 thereby and thereafter resiliently return to engage over top wall 122 when body 66 is completely seated within the recess 30.

To facilitate access to the multiple-compartmented package assembly 20 or 20a for initial intermixing of the dye concentrate with water therein, the tray assembly 26 also has a hinged cover portion 210. In this regard, hinged cover portion 210 forms a part of a larger cover or closure member or portion 212 which covers the entire upper surface of tray assembly 26, overlying all of the package assemblies 20 or 20a and 22 therein. It is contemplated that once introduced thereinto, none of the package assemblies 20 or 20a and 22 will be removed, but will be discarded with the entire tint pack assembly following the tinting of a predetermined number of lenses utilizing the contents thereof. However, to permit the mixing of the dye solution as described above, hinged cover portion 210 is hingedly openable as illustrated in both FIGS. 1 and 11 to permit access to package assembly 20 or 20a. To this end, releasable closure means in the form of a flexible, generally T-shaped closure tab member 214 on the cover portion 210 and a receiving slot or aperture 216 on the body of tray 26 are provided.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and the specific construction described herein but should be defined by the appended claims and equivalents thereof. Accordingly, the aim in the appended claims is to cover all such changes and modifications as fall within the true spirit and scope of the invention.

The invention is claimed as follows:

1. A disposable tint pack assembly for use in an automated contact lens tinting apparatus, comprising: a plurality of disposable package means, each for containing a supply of a given fluid material for use in a contact lens tinting process carried out by said apparatus; fluid dispensing means operatively coupled to each said package means and selectively operable for dispensing the fluid contained therein, tray means for supporting and locating said package means in predetermined relative positions for use in the lens tinting apparatus in a given order in the lens tinting process; and retaining means for releasably holding said package means in said predetermined relative positions in said tray means; wherein each said package means comprises flexible pouch means for containing a supply of fluid, said dispensing means being operatively coupled with said flexible pouch means and adapted for receiving and selectively dispensing the fluid therefrom in predetermined, premeasured increments; wherein each said dispensing means comprises a body portion having a flexible diaphragm, an inlet portion joining said body portion with said flexible pouch means, and outlet means coupled with said body portion for delivering fluid outwardly from said reservoir portion and comprising an elongate nipple defining an axis and having a through bore, one axial end thereof being coupled with said flexible diaphragm, said diaphragm having a through aperture communicating with said though bore; wherein said retaining means comprises a plurality of recess means formed in said tray member, each located for defining a receptacle therein for receiving one of said dispensing means and having a hollow, depending, open-ended projection for receiving and rigidly supporting said elongate nipple, and elastic clip means releasably engaging said dispensing means with said tray means for releasably retaining said dispensing means in said receptacle and said flexible pouch means coupled therewith in a desired position in said tray means; said elongate nipple extending into said supporting receptacle projection and being axially movable therewithin for compressing and releasing said flexible diaphragm to cause release of said premeasured increments of fluid through said nipple through bore, in response to an axially acting force exerted by said automated apparatus upon said elongate nipple, said supporting projection facilitating axial motion of said nipple while substantially preventing transverse motion thereof.

2. An assembly according to claim 1 and further including releasable closure means coupled with at least one of said pouch means for defining a plurality of separate compartments therein; said plurality of compartments including first and second compartments for containing supplies of respective first and second fluids, and a third dispensing compartment which is in communication with said dispensing means and initially devoid of fluid.

3. An assembly according to claim 2 wherein said releasable closure means includes first clip means for separating the first and second fluid-containing compartments and releaseable therefrom to permit intermixing of the first and second fluids contained therein, and second clip means separating the first and second compartments from the third dispensing compartment and releaseable therefrom for permitting introduction of the intermixed first and second fluids to the dispensing compartment to thereafter be dispensed therefrom by said dispensing means.

4. An assembly according to claim 1 wherein said dispensing means comprises pump means for incrementally pumping said fluid from said pouch means.

5. An assembly according to claim 1 wherein each of said one said plurality of recess means defines a receptacle of complementary form for receiving a portion of each said dispensing means body portion therein, and respective front and rear wall members extending upwardly into either side of said recess means, aligned through apertures in the respective front and rear wall portions, and said elastic clip means comprising resilient elongate clip means having a pair of spaced apart elongate leg portions for surroundingly embracing said neck portion and overlying said body portion, said elongate clip means and said leg portions thereof being configured for entering and engaging the respective aligned through apertures to thereby retain said package means and said dispensing means in said predetermined positions in said tray means.

6. An assembly according to claim 5 wherein said resilient clip means further includes an enlarged retainer head portion from which said resilient legs extend, resilient engaging means for engaging one of said through apertures and abutment surface means extending from said head portion for abutting an outer surface of the tray member wall about said one through aperture therein.

7. An assembly according to claim 1 wherein each of said one said plurality of recess means defines a receptacle of complimentary form for receiving a portion of each said dipensing means body portion therein and wherein said clip means comprise a plurality of resilient projections extending upwardly about a periphery of each said recess means, each projection having a ramp-like lead-in surface for initially engaging and directing said projections about, a peripheral surface of said dispensing means body portion for snapping engagement thereover, to retain said body portion in said recess means.

8. An assembly according to claim 1 wherein said dispensing means comprises a compressible fluid reservoir portion defined by said body portion and having a predetermined fluid capacity; said flexible diaphragm defining a boundary of said compressible reservoir portion, said diaphragm being axially displaceable for compressing said reservoir portion and releasing fluid therefrom through said outlet means; and valve means for controlling the flow of fluid into and out of said dispensing means; wherein said dispensing means inlet means is in communication with said pouch means and with said reservoir portion, and wherein said valve means includes first check valve means interposed in said inlet means for blocking the flow of fluid to said reservoir portion when the diaphragm is displaced for compressing said reservoir portion, said check valve permitting the reservoir to fill with a predetermined, measured quantity of fluid corresponding generally to said predetermined fluid capacity thereof in response to resilient return of said diaphragm to a non-displaced position for allowing the reservoir to assume an uncompressed condition.

9. An assembly according to claim 8 wherein said flexible pouch means comprises an elongate, flexible enclosure member and further including releaseable closure means coupled at predetermined positions along said elongate enclosure member for defining separate compartments therewithin.

10. An assembly according to claim 9 wherein each said releaseable closure means comprises an elongate, generally U-shaped flexible female clip member of sufficient length to extend transversely across said elongate enclosure member and a second, complementary elongate male clip member for snappingly engaging and interfitting within said U-shaped female clip member for compressingly engaging the flexible pouch means therebetween so as to define separate and independent compartments therein to either side of said engaged clip members.

11. An assembly according to claim 9 wherein said releaseable closure means are two in number and coupled to the pouch means so as to define three side-by-side compartments in said pouch means, said dispensing means being coupled with one of said three compartments thereby defined.

12. An assembly according to claim 11 wherein said dispensing means is coupled with said pouch means offset to one side of the longitudinal center thereof and wherein said releaseable closure means are positioned therealong for defining a first compartment coupled with said dispensing means and two additional side-by-side compartments to one side of the first compartment.

13. An assembly according to claim 9 wherein said releaseable closure means are four in number, thereby defining five compartments along the length of said pouch means, said dispensing means being coupled with a central portion longitudinally of said pouch means, and said releaseable closure means being positioned for defining a central compartment communicating with said dispensing means and two additional side-by-side compartments to either side thereof.

14. An assembly according to claim 8 wherein said valve means includes a second check valve interposed in said outlet means and normally biased into a closed condition for preventing the flow of fluid from said reservoir to said outlet means when said diaphragm is in a relaxed condition and responsive to the axial displacement of said diaphragm for compressing said reservoir for opening substantially simultaneously therewith to release the fluid from said reservoir portion.

15. An assembly according to claim 14 wherein said valve means further includes a third check valve in said outlet means and oriented for substantially preventing backflow of fluid therethrough.

16. An assembly according to claim 8 wherein said valve means further includes second check valve means in said outlet means normally biased into a closed condition and responsive to displacement of said outlet means in the direction for compressing said reservoir portion for opening substantially simultaneously therewith to release fluid from said reservoir portion through said outlet means.

17. An assembly according to claim 16 wherein said valve means further includes a third check valve within said outlet means for substantially preventing backflow of fluid therethrough.

18. An assembly according to claim 16 wherein said first check valve includes a valve chamber in said inlet means and oppositely oriented through apertures to either side of said valve chamber, one of said through apertures communicating between said valve chamber and said reservoir and a second of said through apertures communicating between said valve chamber and a source of fluid, and a check element in said valve chamber responsive to compression of said reservoir for blocking the flow of fluid therethrough by blocking the second of said apertures.

19. An assembly according to claim 16 wherein said second check valve means comprises a valve body having an elongate shaft and an enlarged head, said elongate shaft extending through said diaphragm through aperture and said enlarged head being axially movable within and permitting fluid flow through said nipple through bore, seal means disposed intermediate said head and said through aperture, and resilient biasing means in said through bore for normally biasing said enlarged head and seal means into engagement with said diaphragm about said through aperture for sealing said through aperture against the flow of fluid therethrough.

20. An assembly according to claim 19 wherein said reservoir has an abutment surface opposite said diaphragm through aperture, and wherein said elongate shaft portion of said valve body extends into said reservoir and is of sufficient length to abut said abutment surface of said reservoir when said diaphragm is displaced an initial mount in the direction for compressing said reservoir thereby releasing engagement of said head and seal means from said diaphragm surface about said through aperture in opposition to said resilient biasing means, to permit the flow of fluid therethrough and through said nipple, said compression of said reservoir further acting to deliver said premeasured quantity of fluid corresponding to the capacity of said reservoir through said nipple.

21. An assembly according to claim 20 wherein said nipple and said diaphragm are coupled together axially whereby axial movement of either causes corresponding movement of the other for alternately forcing fluid out of said reservoir and allowing said reservoir to fill with fluid upon operation of the first and second check valve means in response to compression and relaxation of said reservoir.

* * * * *